(12) United States Patent
Mali et al.

(10) Patent No.: US 10,805,949 B2
(45) Date of Patent: Oct. 13, 2020

(54) PROCESSING RETRANSMISSIONS IN SEMI-PERSISTENTLY SCHEDULED WIRELESS COMMUNICATIONS

(71) Applicant: QUALCOMM Incorporated, San Diego, CA (US)

(72) Inventors: Nikhil Mali, Parsippany, NJ (US); Manjinder Singh Sandhu, Poway, CA (US); Arnaud Meylan, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 118 days.

(21) Appl. No.: 16/014,964

(22) Filed: Jun. 21, 2018

(65) Prior Publication Data
US 2019/0394794 A1    Dec. 26, 2019

(51) Int. Cl.
*H04W 74/08* (2009.01)
*H04W 74/00* (2009.01)
*H04W 72/14* (2009.01)

(52) U.S. Cl.
CPC ......... *H04W 72/14* (2013.01); *H04W 74/004* (2013.01); *H04W 74/0833* (2013.01)

(58) Field of Classification Search
CPC .......................... H04W 72/14; H04W 74/004

USPC ........................................................ 370/329
See application file for complete search history.

(56) References Cited

U.S. PATENT DOCUMENTS

| 9,288,004 | B2 | 3/2016 | Barbieri et al. |
| 2013/0100936 | A1* | 4/2013 | Pettersson ......... H04W 72/0446 370/336 |
| 2015/0245326 | A1* | 8/2015 | Rune ..................... H04L 1/0003 370/329 |
| 2017/0331577 | A1 | 11/2017 | Parkvall et al. |
| 2017/0346613 | A1 | 11/2017 | Fan et al. |
| 2018/0110066 | A1 | 4/2018 | Luo et al. |
| 2018/0176949 | A1* | 6/2018 | Islam ................... H04W 52/146 |
| 2020/0008183 | A1* | 1/2020 | Chen ..................... H04W 76/34 |

OTHER PUBLICATIONS

Sony: "Discussion on Non-contention and Contention based transmission without Grant", R1-1703137, 3GPP TSG RAN WG1 NR Meeting #88, Athens, Greece Feb. 13-17, 2017, 3 pages.

* cited by examiner

*Primary Examiner* — Angel T Brockman
(74) *Attorney, Agent, or Firm* — Arent Fox, LLP

(57) ABSTRACT

Aspects herein describe utilizing semi-persistent scheduling (SPS) resources in wireless communications. An indication to retransmit information for SPS resources can be received from an access point. It can be determined that a SPS activation for the SPS resources is not received from the access point. Based on this determination, one or more signals can be transmitted.

34 Claims, 7 Drawing Sheets

PROCESSING RETRANSMISSIONS IN SEMI-PERSISTENTLY SCHEDULED WIRELESS COMMUNICATIONS

BACKGROUND

Aspects of the present disclosure relate generally to wireless communication systems, and more particularly, to improving reliability of wireless communications over semi-persistent scheduling (SPS) resources.

Wireless communication systems are widely deployed to provide various types of communication content such as voice, video, packet data, messaging, broadcast, and so on. These systems may be multiple-access systems capable of supporting communication with multiple users by sharing the available system resources (e.g., time, frequency, and power). Examples of such multiple-access systems include code-division multiple access (CDMA) systems, time-division multiple access (TDMA) systems, frequency-division multiple access (FDMA) systems, and orthogonal frequency-division multiple access (OFDMA) systems, and single-carrier frequency division multiple access (SC-FDMA) systems.

These multiple access technologies have been adopted in various telecommunication standards to provide a common protocol that enables different wireless devices to communicate on a municipal, national, regional, and even global level. An example of a telecommunication standard is Long Term Evolution (LTE). LTE is a set of enhancements to the Universal Mobile Telecommunications System (UMTS) mobile standard promulgated by Third Generation Partnership Project (3GPP). It is designed to better support mobile broadband Internet access by improving spectral efficiency, lower costs, improve services, make use of new spectrum, and better integrate with other open standards using OFDMA on the downlink (DL), SC-FDMA on the uplink (UL), and multiple-input multiple-output (MIMO) antenna technology. Another example of a telecommunication standard is fifth generation (5G) wireless communications technology, which can be referred to as 5G new radio (5G NR), and is envisaged to expand and support diverse usage scenarios and applications with respect to current mobile network generations. In an aspect, 5G communications technology can include services such as: enhanced mobile broadband (eMBB) addressing human-centric use cases for access to multimedia content, services and data; ultra-reliable-low latency communications (URLLC) with certain specifications for latency and reliability; and massive machine type communications, which can allow a very large number of connected devices and transmission of a relatively low volume of non-delay-sensitive information. As the demand for mobile broadband access continues to increase, however, further improvements in 5G communications technology and beyond may be desired.

Semi-persistent scheduling (SPS) is provided in some telecommunication standards to reduce load on control channels by configuring devices to receive resource scheduling grants at defined periodicities. As such, SPS is being used to support periodic communications, such as voice over LTE (VoLTE), to allow for scheduling resources when needed for communication packets without overloading the control channel. There may be scenarios, however, where SPS is not properly configured on the device, which can cause dropping voice communications and undesirable user experience.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

According to an example, a method for utilizing semi-persistent scheduling (SPS) resources in wireless communications is provided. The method includes receiving, from an access point, an indication to retransmit information for SPS resources, determining that a SPS activation for the SPS resources is not received from the access point, and transmitting, to the access point and based on determining that the SPS activation is not received, one or more signals.

In another example, an apparatus for utilizing SPS resources in wireless communications is provided. The apparatus includes a transceiver for communicating one or more wireless signals via at least a transmitter and one or more antennas, a memory configured to store instructions, and one or more processors communicatively coupled with the transceiver and the memory. The one or more processors are configured to receive, from an access point, an indication to retransmit information for SPS resources, determine that a SPS activation for the SPS resources is not received from the access point, and transmit, to the access point and based on determining that the SPS activation is not received, one or more signals.

In another example, an apparatus for utilizing SPS resources in wireless communications is provided. The apparatus includes means for receiving, from an access point, an indication to retransmit information for SPS resources, means for determining that a SPS activation for the SPS resources is not received from the access point, and means for transmitting, to the access point and based on determining that the SPS activation is not received, one or more signals.

In another example, a computer-readable medium, including code executable by one or more processors for utilizing SPS resources in wireless communications is provided. The code includes code for receiving, from an access point, an indication to retransmit information for SPS resources, code for determining that a SPS activation for the SPS resources is not received from the access point, and code for transmitting, to the access point and based on determining that the SPS activation is not received, one or more signals.

In another aspect, a method for allocating SPS resources in wireless communications is provided. The method includes transmitting, by an access point and to a device, a request for retransmitting information over SPS resources, determining, by the access point, that the device did not receive at least one of a SPS activation or a SPS grant for the SPS resources, and transmitting, to the device and based on detecting that the device did not receive at least one of the SPS activation or the SPS grant, a subsequent grant to schedule resources for uplink transmission.

In a further aspect, an apparatus for allocating SPS resources in wireless communications is provided. The apparatus includes a transceiver for communicating one or more wireless signals via at least a transmitter and one or more antennas, a memory configured to store instructions, and one or more processors communicatively coupled with the transceiver and the memory. The one or more processors are configured to transmit, to a device, a request for retransmitting information over SPS resources, determine that the device did not receive at least one of a SPS activation or a SPS grant for the SPS resources, and transmit, to the device and based on detecting that the device did not receive at least one of the SPS activation or the SPS grant, a subsequent grant to schedule resources for uplink transmission.

In another aspect, an apparatus for allocating SPS resources in wireless communications is provided. The apparatus includes means for transmitting, by an access point and to a device, a request for retransmitting information over SPS resources, means for determining, by the access point, that the device did not receive at least one of a SPS activation or a SPS grant for the SPS resources, and means for transmitting, to the device and based on detecting that the device did not receive at least one of the SPS activation or the SPS grant, a subsequent grant to schedule resources for uplink transmission.

In another aspect, a computer-readable medium, including code executable by one or more processors for allocating SPS resources in wireless communications is provided. The code includes code for transmitting, by an access point and to a device, a request for retransmitting information over SPS resources, code for determining, by the access point, that the device did not receive at least one of a SPS activation or a SPS grant for the SPS resources, and code for transmitting, to the device and based on detecting that the device did not receive at least one of the SPS activation or the SPS grant, a subsequent grant to schedule resources for uplink transmission.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

The disclosed aspects will hereinafter be described in conjunction with the appended drawings, provided to illustrate and not to limit the disclosed aspects, wherein like designations denote like elements, and in which.

DETAILED DESCRIPTION

Figure 1:
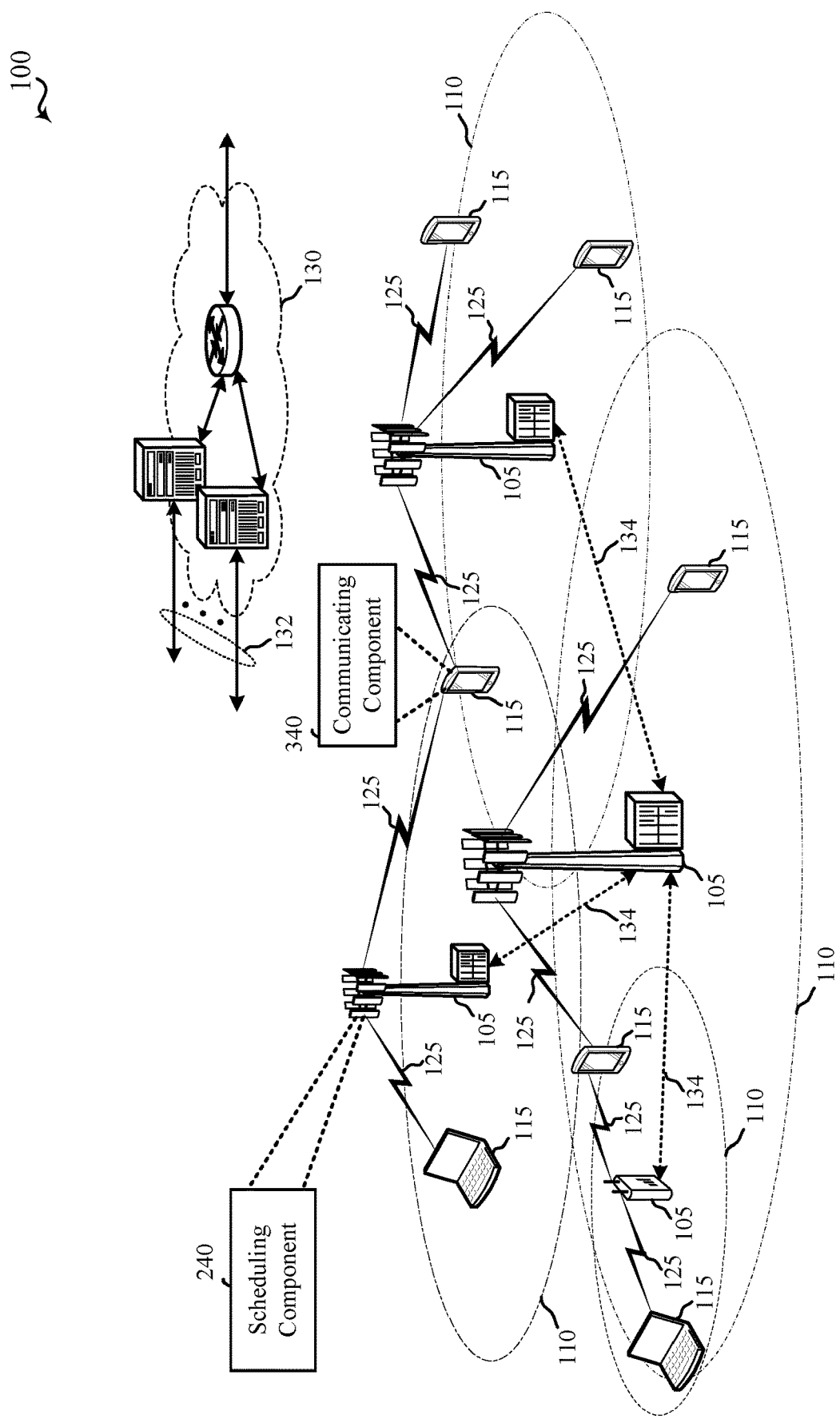
FIG. 1 illustrates an example of a wireless communication system, in accordance with various aspects of the present disclosure.

Various aspects are now described with reference to the drawings. In the following description, for purposes of explanation, numerous specific details are set forth in order to provide a thorough understanding of one or more aspects. It may be evident, however, that such aspect(s) may be practiced without these specific details.

The described features generally relate to communicating over semi-persistent scheduling (SPS) resources in wireless communications. A wireless communication node (such as an access point) can configure another wireless communication node (such as an access terminal or other device) to communicate using SPS resources where the access point can periodically grant various SPS resources to various devices over a control channel. It may be possible that the access point requests retransmission of information over SPS resources but that the device from which retransmission is requested may not have received a SPS activation from the access point (e.g., due to poor radio conditions or another cause), and thus may not have activated uplink SPS. In this case, conventional devices may skip the retransmission, which can lead to undesirable results in the wireless communication, such as degradation of voice quality in voice-over-LTE (VoLTE) calls. For example, in 5G or LTE (e.g., based on third generation partnership project (3GPP) technical specification (TS) 36.213, section 8.6.1), if the device (e.g., a user equipment (UE)) cannot determine modulation and coding scheme (MCS), incremental redundancy version (IRV), resource blocks (RBs), and/or transport block size (TBS) for a transmission (e.g., the UE did not receive an initial grant to derive these parameters), the transmission can be skipped.

Thus, in examples described herein, the device can detect when a retransmission request is received from an access point, though the device may not have received a corresponding SPS activation. In this example, the device can perform an activation recovery procedure to request SPS resources for the retransmission. In another example, the device can determine when SPS is configured, and can accordingly adjust one or more communication parameters to improve reliability of receiving SPS activations. For example, the device can modify or disable a power savings feature, such as an automatic receive diversity (ARD) feature. In another example, the device can modify a transceiver resource manager (TRM) priority of a subscription configured for the SPS communication based on detecting the SPS configuration. In other examples, the access node can detect when the device has not received a SPS activation for retransmission resources. For example, the access node can determine a number of consecutive request for retransmission sent to the device, and where the number achieves a threshold, the access point can transmit an SPS grant to the device indicating subsequent SPS resources over which the device can transmit the requested retransmission. Thus, using any of the above mechanisms, SPS transmission can be improved, which can increase reliability/desirability of communications that use SPS resources, such as VoLTE.

Though many concepts are described in terms of an access point configuring a device (or a base station configuring a UE) with SPS resources, in some examples, substantially any configuration of communicating devices can perform the same or similar functions described herein.

The described features will be presented in more detail below with reference to FIGS. 1-7.

As used in this application, the terms "component," "module," "system" and the like are intended to include a computer-related entity, such as but not limited to hardware, firmware, a combination of hardware and software, software, or software in execution. For example, a component may be, but is not limited to being, a process running on a processor, a processor, an object, an executable, a thread of execution, a program, and/or a computer. By way of illustration, both an application running on a computing device and the computing device can be a component. One or more components can reside within a process and/or thread of execution and a component can be localized on one computer and/or distributed between two or more computers. In addition, these components can execute from various computer readable media having various data structures stored thereon. The components can communicate by way of local and/or remote processes such as in accordance with a signal having one or more data packets, such as data from one component interacting with another component in a local system, distributed system, and/or across a network such as the Internet with other systems by way of the signal.

Techniques described herein may be used for various wireless communication systems such as CDMA, TDMA, FDMA, OFDMA, SC-FDMA, and other systems. The terms "system" and "network" may often be used interchangeably. A CDMA system may implement a radio technology such as CDMA2000, Universal Terrestrial Radio Access (UTRA), etc. CDMA2000 covers IS-2000, IS-95, and IS-856 standards. IS-2000 Releases 0 and A are commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile Communications (GSM). An OFDMA system may implement a radio technology such as Ultra Mobile Broadband (UMB), Evolved UTRA (E-UTRA), IEEE 802.11 (Wi-Fi), IEEE 802.16 (WiMAX), IEEE 802.20, Flash-OFDM™, etc. UTRA and E-UTRA are part of Universal Mobile Telecommunication System (UMTS). 3GPP Long Term Evolution (LTE) and LTE-Advanced (LTE-A) are new releases of UMTS that use E-UTRA. UTRA, E-UTRA, UMTS, LTE, LTE-A, and GSM are described in documents from an organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies, including cellular (e.g., LTE) communications over a shared radio frequency spectrum band. The description below, however, describes an LTE/LTE-A system for purposes of example, and LTE terminology is used in much of the description below, although the techniques are applicable beyond LTE/LTE-A applications (e.g., to 5G networks or other next generation communication systems).

The following description provides examples, and is not limiting of the scope, applicability, or examples set forth in the claims. Changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in other examples.

Various aspects or features will be presented in terms of systems that can include a number of devices, components, modules, and the like. It is to be understood and appreciated that the various systems can include additional devices, components, modules, etc. and/or may not include all of the devices, components, modules etc. discussed in connection with the figures. A combination of these approaches can also be used.

FIG. 1 illustrates an example of a wireless communication system 100 in accordance with various aspects of the present disclosure. The wireless communication system 100 may include one or more base stations 105, one or more UEs 115, and a core network 130. The core network 130 may provide user authentication, access authorization, tracking, internet protocol (IP) connectivity, and other access, routing, or mobility functions. The base stations 105 may interface with the core network 130 through backhaul links 132 (e.g., S1, etc.). The base stations 105 may perform radio configuration and scheduling for communication with the UEs 115, or may operate under the control of a base station controller (not shown). In various examples, the base stations 105 may communicate, either directly or indirectly (e.g., through core network 130), with one another over backhaul links 134 (e.g., X2, etc.), which may be wired or wireless communication links.

The base stations 105 may wirelessly communicate with the UEs 115 via one or more base station antennas. Each of the base stations 105 may provide communication coverage for a respective geographic coverage area 110. In some examples, base stations 105 may be referred to as a network entity, a base transceiver station, a radio base station, an access point, a radio transceiver, a NodeB, eNodeB (eNB), Home NodeB, a Home eNodeB, or some other suitable terminology. The geographic coverage area 110 for a base station 105 may be divided into sectors making up only a portion of the coverage area (not shown). The wireless communication system 100 may include base stations 105 of different types (e.g., macro or small cell base stations). There may be overlapping geographic coverage areas 110 for different technologies.

In some examples, the wireless communication system 100 may be or include a Long Term Evolution (LTE) or LTE-Advanced (LTE-A) network. The wireless communication system 100 may also be a next generation network, such as a 5G wireless communication network. In LTE/LTE-A networks, the term evolved node B (eNB), gNB, etc. may be generally used to describe the base stations 105, while the term UE may be generally used to describe the UEs 115. The wireless communication system 100 may be a heterogeneous LTE/LTE-A network in which different types of eNBs provide coverage for various geographical regions. For example, each eNB or base station 105 may provide communication coverage for a macro cell, a small cell, or other types of cell. The term "cell" is a 3GPP term that can be used to describe a base station, a carrier or component carrier associated with a base station, or a coverage area (e.g., sector, etc.) of a carrier or base station, depending on context.

A macro cell may cover a relatively large geographic area (e.g., several kilometers in radius) and may allow unrestricted access by the UEs 115 with service subscriptions with the network provider.

A small cell may include a lower-powered base station, as compared with a macro cell, that may operate in the same or different (e.g., licensed, unlicensed, etc.) frequency bands as macro cells. Small cells may include pico cells, femto cells, and micro cells according to various examples. A pico cell, for example, may cover a small geographic area and may allow unrestricted access by the UEs 115 with service subscriptions with the network provider. A femto cell may also cover a small geographic area (e.g., a home) and may provide restricted access by the UEs 115 having an association with the femto cell (e.g., UEs 115 in a closed subscriber group (CSG), UEs 115 for users in the home, and the like). An eNB for a macro cell may be referred to as a macro eNB, gNB, etc. An eNB for a small cell may be referred to as a small cell eNB, a pico eNB, a femto eNB, or a home eNB. An eNB may support one or multiple (e.g., two, three, four, and the like) cells (e.g., component carriers).

The communication networks that may accommodate some of the various disclosed examples may be packet-based networks that operate according to a layered protocol stack and data in the user plane may be based on the IP. A packet data convergence protocol (PDCP) layer can provide header compression, ciphering, integrity protection, etc. of IP packets. A radio link control (RLC) layer may perform packet segmentation and reassembly to communicate over logical channels. A MAC layer may perform priority handling and multiplexing of logical channels into transport channels. The MAC layer may also use HARQ to provide retransmission at the MAC layer to improve link efficiency. In the control plane, the radio resource control (RRC) protocol layer may provide establishment, configuration, and maintenance of an RRC connection between a UE 115 and the base stations 105. The RRC protocol layer may also be used for core network 130 support of radio bearers for the user plane data. At the physical (PHY) layer, the transport channels may be mapped to physical channels.

The UEs 115 may be dispersed throughout the wireless communication system 100, and each UE 115 may be stationary or mobile. A UE 115 may also include or be referred to by those skilled in the art as a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology. A UE 115 may be a cellular phone, a personal digital assistant (PDA), a wireless modem, a wireless communication device, a handheld device, a tablet computer, a laptop computer, a cordless phone, a wireless local loop (WLL) station, an entertainment device, a vehicular component, or the like. A UE may be able to communicate with various types of base stations and network equipment including macro eNBs, small cell eNBs, relay base stations, and the like.

The communication links 125 shown in wireless communication system 100 may carry uplink (UL) transmissions from a UE 115 to a base station 105, or downlink (DL) transmissions, from a base station 105 to a UE 115. The downlink transmissions may also be called forward link transmissions while the uplink transmissions may also be called reverse link transmissions. Each communication link 125 may include one or more carriers, where each carrier may be a signal made up of multiple sub-carriers (e.g., waveform signals of different frequencies) modulated according to the various radio technologies described above. Each modulated signal may be sent on a different sub-carrier and may carry control information (e.g., reference signals, control channels, etc.), overhead information, user data, etc. The communication links 125 may transmit bidirectional communications using frequency division duplex (FDD) (e.g., using paired spectrum resources) or time division duplex (TDD) operation (e.g., using unpaired spectrum resources). Frame structures may be defined for FDD (e.g., frame structure type 1) and TDD (e.g., frame structure type 2).

In aspects of the wireless communication system 100, base stations 105 or UEs 115 may include multiple antennas for employing antenna diversity schemes to improve communication quality and reliability between the base stations 105 and UEs 115. Additionally or alternatively, the base stations 105 or UEs 115 may employ multiple input multiple output (MIMO) techniques that may take advantage of multi-path environments to transmit multiple spatial layers carrying the same or different coded data.

Wireless communication system 100 may support operation on multiple cells or carriers, a feature which may be referred to as carrier aggregation (CA) or multi-carrier operation. A carrier may also be referred to as a component carrier (CC), a layer, a channel, etc. The terms "carrier," "component carrier," "cell," and "channel" may be used interchangeably herein. A UE 115 may be configured with multiple downlink CCs and one or more uplink CCs for carrier aggregation. Carrier aggregation may be used with both FDD and TDD component carriers.

In an example, one or more base stations 105 can include a scheduling component 240 for configuring a SPS communication mode with one or more UEs 115, assigning SPS resources for communicating with the one or more UEs 115, etc. The one or more UEs 115 can include a communicating component 340 for configuring the SPS communication mode with the one or more base station 105 to receive semi-persistently scheduled resources from the one or more base stations 105 and communicating with the one or more base stations 105 over the resources. In an example, scheduling component 240 and/or communicating component 340 can also be configured to improve reliability of communications over SPS resources. For example, communicating component 340 can be configured to detect when an SPS retransmission is requested from one or more base stations 105 but a SPS activation has not been received. In this example, communicating component 340 can request a SPS grant, use parameters from a previously received SPS activation and/or grant, etc. to retransmit the SPS communications to the one or more base stations 105. In another example, communicating component 340 can modify communication parameters based on activation of SPS communications to improve reliability of the SPS communications. For example, communicating component 340 can modify one or more power savings mechanisms, adjust a priority of a subscription corresponding to the SPS communications, etc. In yet another example, scheduling component 240 can detect when a number of consecution retransmission request are sent to the one or more UEs 115 without response, and can accordingly transmit an SPS grant to the one or more UEs 115.

Figure 2:
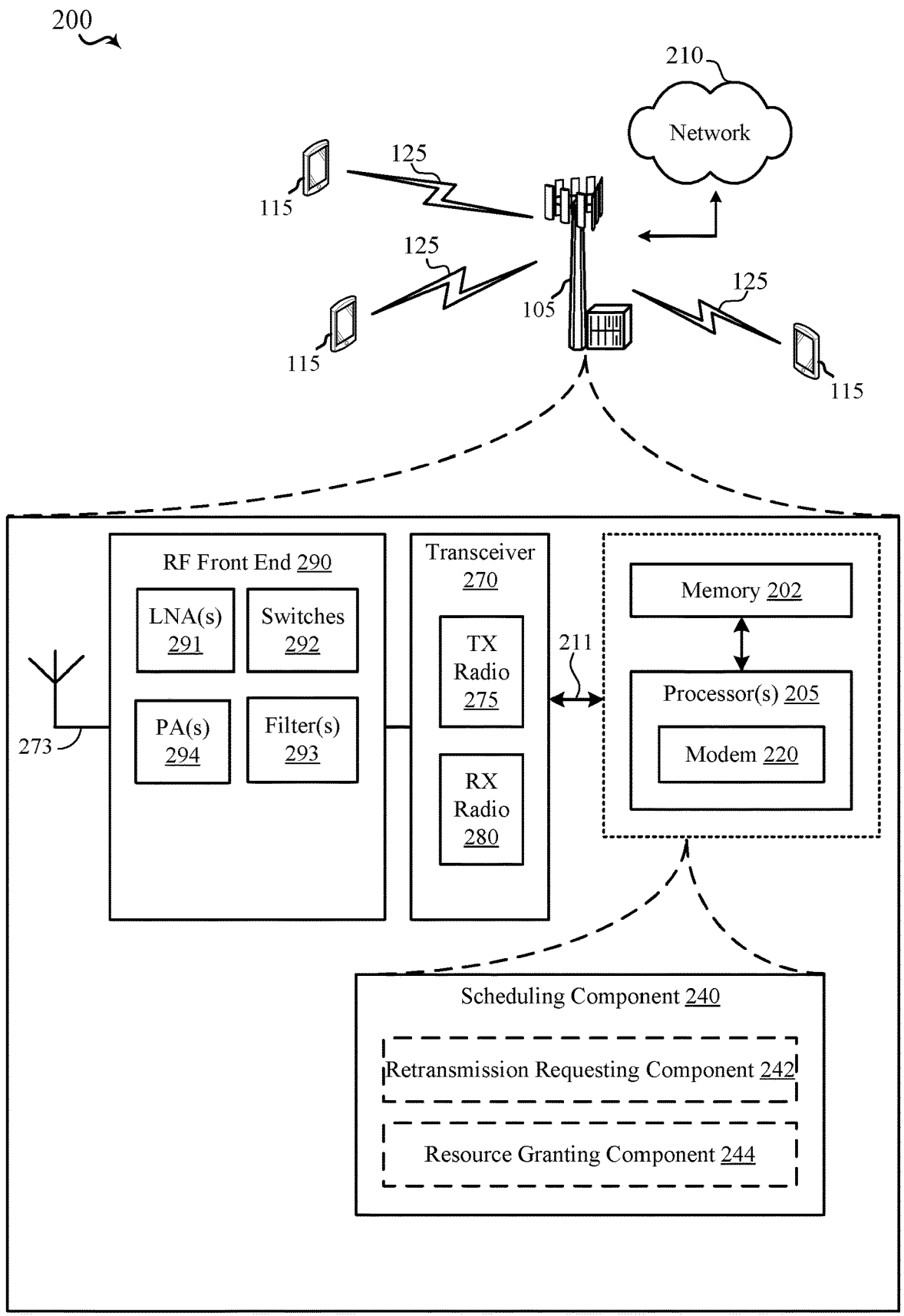
FIG. 2 is a block diagram illustrating an example of a base station, in accordance with various aspects of the present disclosure.
Figure 3:
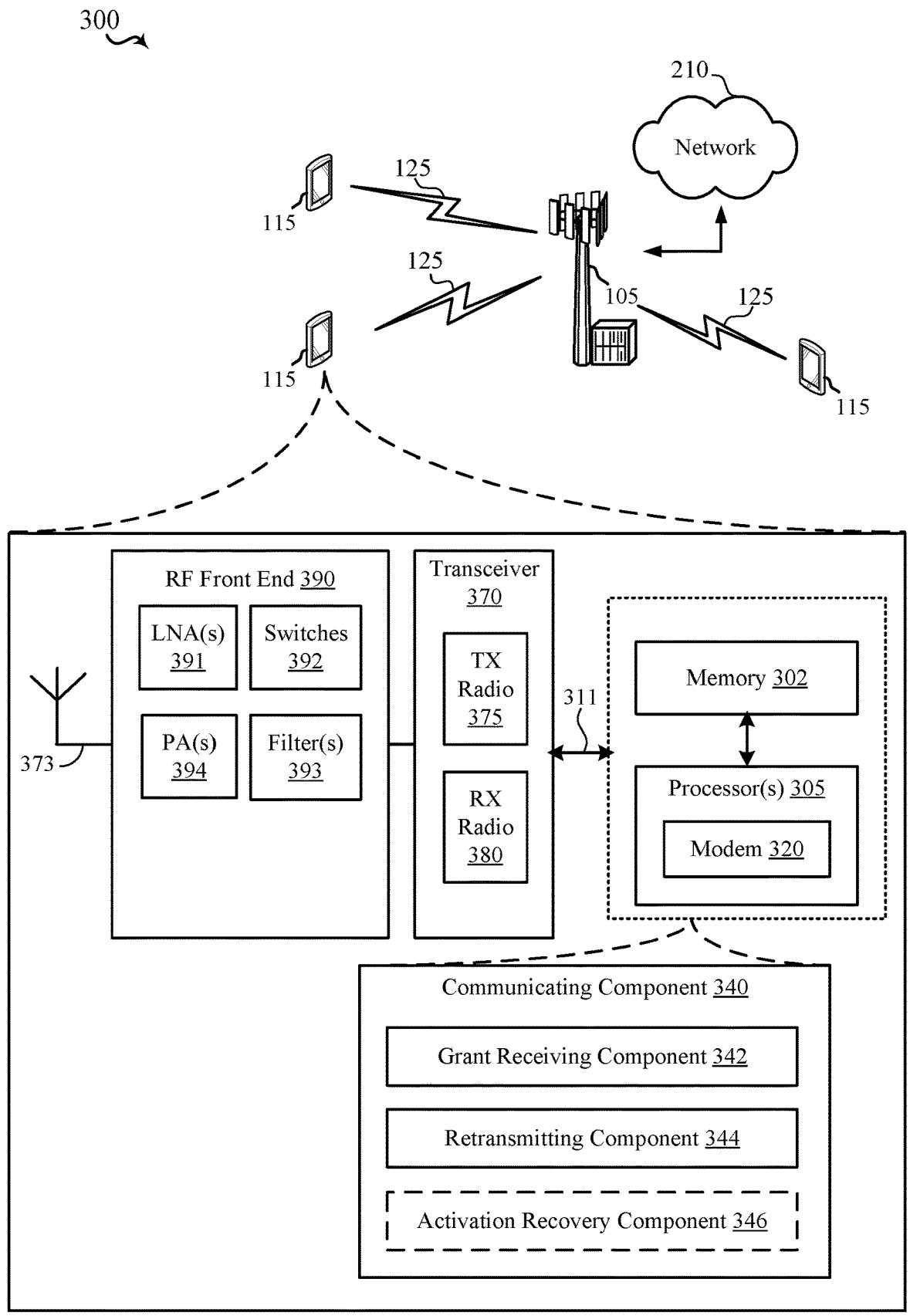
FIG. 3 is a block diagram illustrating an example of a UE, in accordance with various aspects of the present disclosure.
Figure 4:
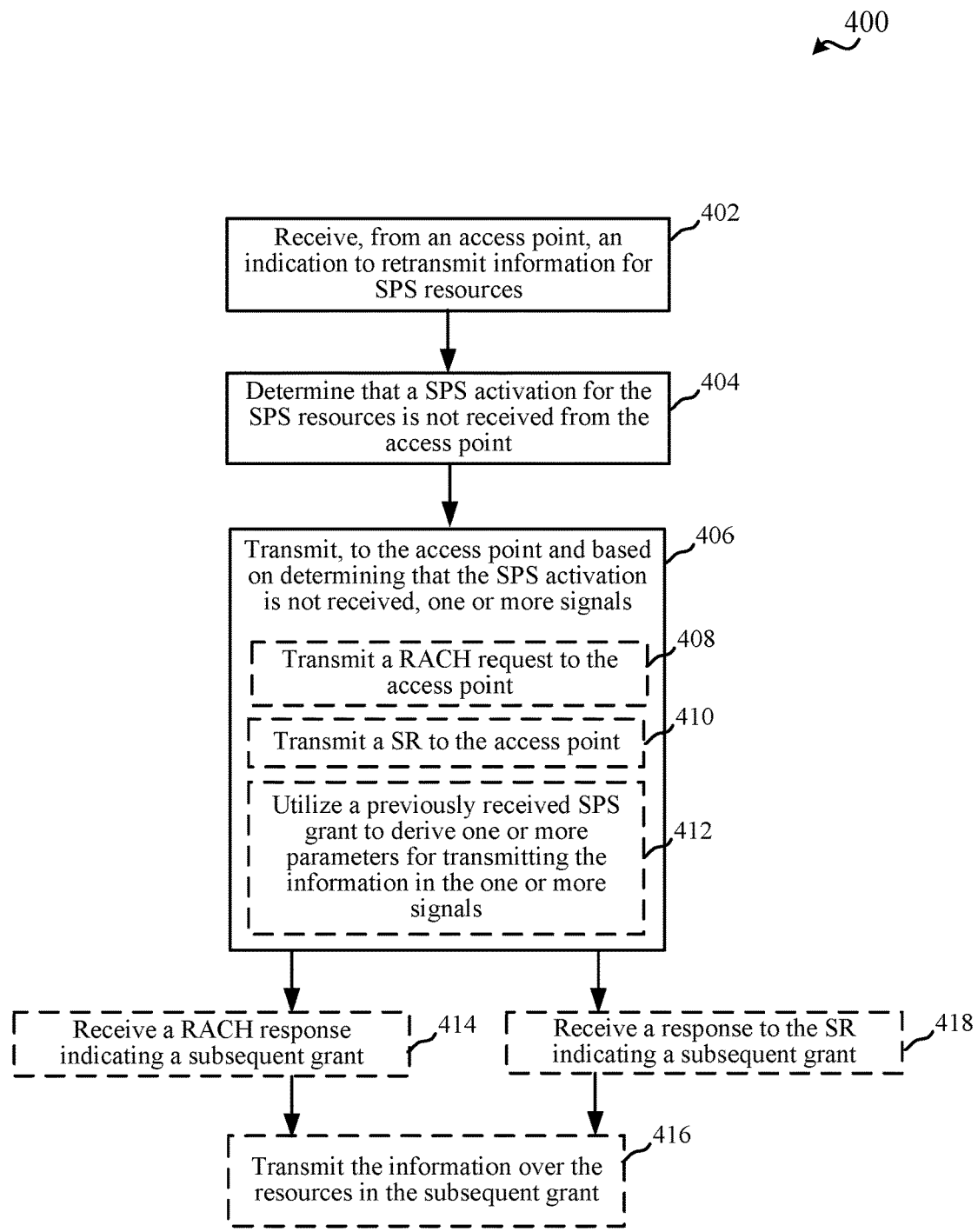
FIG. 4 is a flow chart illustrating an example of a method for detecting that a semi-persistent scheduling (SPS) grant is not received for retransmitting a communication, in accordance with various aspects of the present disclosure.
Figure 5:
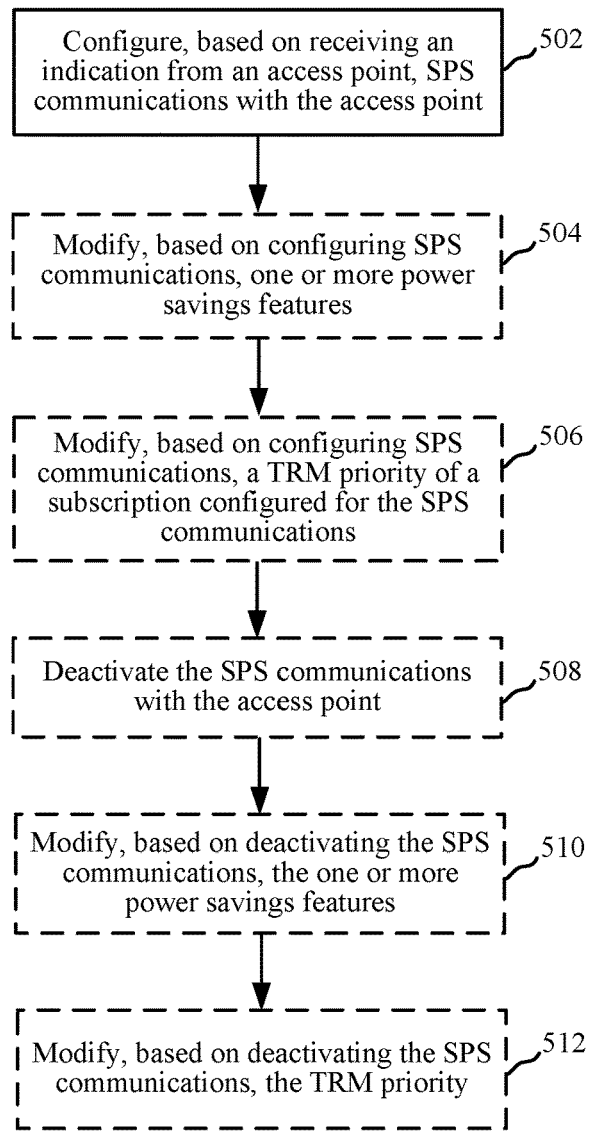
FIG. 5 is a flow chart illustrating an example of a method for modifying communication parameters based on activating SPS communications, in accordance with various aspects of the present disclosure.
Figure 6:
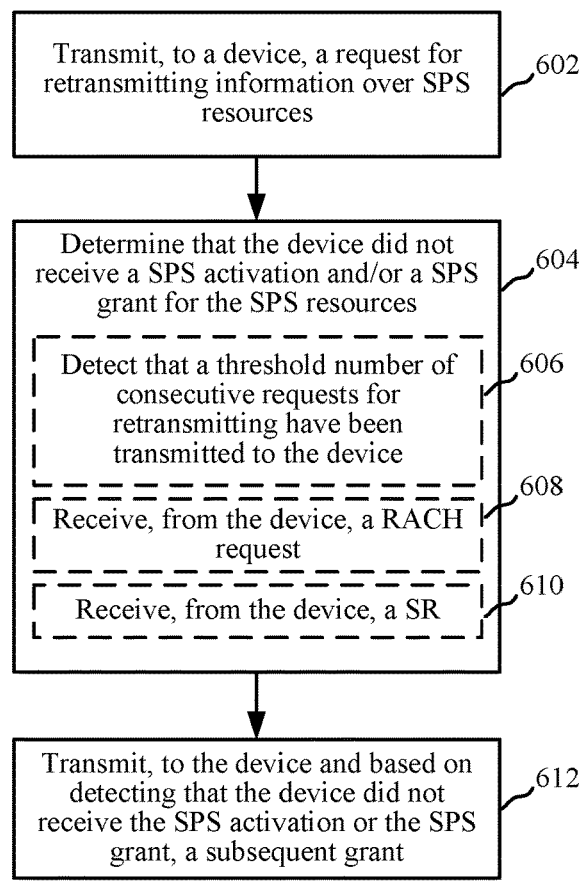
FIG. 6 is a flow chart illustrating an example of a method for transmitting a SPS grant, in accordance with various aspects of the present disclosure.

Turning now to FIGS. 2-7, aspects are depicted with reference to one or more components and one or more methods that may perform the actions or operations described herein, where aspects in dashed line may be optional. Although the operations described below in FIGS. 4-6 are presented in a particular order and/or as being performed by an example component, it should be understood that the ordering of the actions and the components performing the actions may be varied, depending on the implementation. Moreover, it should be understood that the following actions, functions, and/or described components may be performed by a specially-programmed processor, a processor executing specially-programmed software or computer-readable media, or by any other combination of a hardware component and/or a software component capable of performing the described actions or functions.

Referring to FIG. 2, a block diagram 200 is shown that includes a portion of a wireless communications system having multiple UEs 115 in communication with a base station 105 via communication links 125, where the base station 105 is also communicatively coupled with a network 210. The UEs 115 may be examples of the UEs described in the present disclosure that are configured to communicate over SPS resources scheduled by the base station 105. Moreover the base station 105 may be an example of the base stations described in the present disclosure (e.g., eNB, gNB, etc.) that are configured to grant SPS resources to the UEs 115 for communicating therewith.

In an aspect, the base station in FIG. 2 may include one or more processors 205 and/or memory 202 that may operate in combination with a scheduling component 240 to perform the functions or methods (e.g., method 600 of FIG. 6) presented herein, which may include configuring SPS resources for the one or more UEs 115, transmitting an SPS activation and/or SPS grant of the SPS resources to the one or more UEs 115, receiving communications from the one or more UEs 115 over the configured SPS resources, detecting that one or more UEs 115 did not receive a SPS activation for an SPS retransmission, etc. In accordance with the present disclosure, the scheduling component 240 may include an optional retransmission requesting component 242 for transmitting a retransmission request to the one or more UEs 115 to cause the one or more UEs 115 to retransmit a previously transmitted communication, and/or an optional resource granting component 244 for indicating one or more parameters for granting SPS resources to the one or more UEs 115 over which the one or more UEs 115 can transmit communications to the one or more baes stations 105.

The one or more processors 205 may include a modem 220 that uses one or more modem processors. The various functions related to the scheduling component 240, and/or sub-components thereof, may be included in modem 220 and/or processor 205 and, in an aspect, can be executed by a single processor, while in other aspects, different ones of the functions may be executed by a combination of two or more different processors. For example, in an aspect, the one or more processors 205 may include any one or any combination of a modem processor, or a baseband processor, or a digital signal processor, or a transmit processor, or a transceiver processor associated with transceiver 270, or a system-on-chip (SoC). In particular, the one or more processors 205 may execute functions and components included in the scheduling component 240.

In some examples, the scheduling component 240 and each of the sub-components may comprise hardware, firmware, and/or software and may be configured to execute code or perform instructions stored in a memory (e.g., a computer-readable storage medium, such as memory 202 discussed below). Moreover, in an aspect, the base station 105 in FIG. 2 may include a radio frequency (RF) front end 290 and transceiver 270 for receiving and transmitting radio transmissions to, for example, UEs 115. The transceiver 270 may coordinate with the modem 220 to receive signals for, or transmit signals generated by, the scheduling component 240 to the UEs 115. The RF front end 290 may be communicatively coupled with one or more antennas 273 and can include one or more switches 292, one or more amplifiers (e.g., power amplifiers (PAs) 294 and/or low-noise amplifiers 291), and one or more filters 293 for transmitting and receiving RF signals on uplink channels and downlink channels. In an aspect, the components of the RF front end 290 can be communicatively coupled with transceiver 270.

The transceiver 270 may be communicatively coupled with the one or more of modem 220 and processors 205.

The transceiver 270 may be configured to transmit (e.g., via transmitter (TX) radio 275) and receive (e.g., via receiver (RX) radio 280) wireless signals through antennas 273 via the RF front end 290. In an aspect, the transceiver 270 may be tuned to operate at specified frequencies such that the base station 105 can communicate with, for example, UEs 115. In an aspect, for example, the modem 220 can configure the transceiver 270 to operate at a specified frequency and power level based on the configuration of the base station 105 and communication protocol used by the modem 220.

The base station 105 in FIG. 2 may further include a memory 202, such as for storing data used herein and/or local versions of applications or scheduling component 240 and/or one or more of its sub-components being executed by processor 205. Memory 202 can include any type of computer-readable medium usable by a computer or processor 205, such as random access memory (RAM), read only memory (ROM), tapes, magnetic discs, optical discs, volatile memory, non-volatile memory, and any combination thereof. In an aspect, for example, memory 202 may be a computer-readable storage medium that stores one or more computer-executable codes defining scheduling component 240 and/or one or more of its sub-components. Additionally or alternatively, the base station 105 may include a bus 211 for communicatively coupling one or more of the RF front end 290, the transceiver 274, the memory 202, or the processor 205, and to exchange signaling information between each of the components and/or sub-components of the base station 105.

In an aspect, the processor(s) 205 may correspond to one or more of the processors described in connection with the base station in FIG. 7. Similarly, the memory 202 may correspond to the memory described in connection with the base station in FIG. 7.

Referring to FIG. 3, a block diagram 300 is shown that includes a portion of a wireless communications system having multiple UEs 115 in communication with a base station 105 via communication links 125, where the base station 105 is also communicatively coupled with a network 210. The UEs 115 may be examples of the UEs described in the present disclosure that are configured to communicate over SPS resources scheduled by the base station 105. Moreover the base station 105 may be an example of the base stations described in the present disclosure (e.g., eNB, gNB, etc.) that are configured to grant SPS resources to the UEs 115 for communicating therewith.

In an aspect, the UE 115 in FIG. 3 may include one or more processors 305 and/or memory 302 that may operate in combination with a communicating component 340 to perform the functions or methods (e.g., method 400 of FIG. 4, method 500 of FIG. 5) presented in the present disclosure for configuring SPS resources, communicating over the SPS resources, detecting when a retransmission request is received without a corresponding SPS activation, adjusting one or more parameters based on configuring SPS communications, etc. In accordance with the present disclosure, the communicating component 340 may include a grant receiving component 342 for receiving SPS activations and/or grants from the one or more base stations 105, a retransmitting component 344 for retransmitting communications to the one or more base stations 105 over configured SPS resources, and/or an optional activation recovery component 346 for performing one or more activation recovery procedures to determine parameters for retransmitting a communication over resources configured for SPS communications.

The one or more processors 305 may include a modem 320 that uses one or more modem processors. The various functions related to the communicating component 340, and/or its sub-components, may be included in modem 320 and/or processor 305 and, in an aspect, can be executed by a single processor, while in other aspects, different ones of the functions may be executed by a combination of two or more different processors. For example, in an aspect, the one or more processors 305 may include any one or any combination of a modem processor, or a baseband processor, or a digital signal processor, or a transmit processor, or a transceiver processor associated with transceiver 370, or a system-on-chip (SoC). In particular, the one or more processors 305 may execute functions and components included in the communicating component 340.

In some examples, the communicating component 340 and each of the sub-components may comprise hardware, firmware, and/or software and may be configured to execute code or perform instructions stored in a memory (e.g., a computer-readable storage medium, such as memory 302 discussed below). Moreover, in an aspect, the UE 115 in FIG. 3 may include an RF front end 390 and transceiver 370 for receiving and transmitting radio transmissions to, for example, base stations 105. The transceiver 370 may coordinate with the modem 320 to receive signals that include the packets as received by the communicating component 340. The RF front end 390 may be communicatively coupled with one or more antennas 373 and can include one or more switches 392, one or more amplifiers (e.g., PAs 394 and/or LNAs 391), and one or more filters 393 for transmitting and receiving RF signals on uplink channels and downlink channels. In an aspect, the components of the RF front end 390 can be communicatively coupled with transceiver 370. The transceiver 370 may be communicatively coupled with one or more of modem 320 and processors 305.

The transceiver 370 may be configured to transmit (e.g., via transmitter (TX) radio 375) and receive (e.g., via receiver (RX) radio 380) wireless signals through antennas 373 via the RF front end 390. In an aspect, the transceiver 370 may be tuned to operate at specified frequencies such that the UE 115 can communicate with, for example, base stations 105. In an aspect, for example, the modem 320 can configure the transceiver 370 to operate at a specified frequency and power level based on the configuration of the UE 115 and communication protocol used by the modem 320.

The UE 115 in FIG. 3 may further include a memory 302, such as for storing data used herein and/or local versions of applications or communicating component 340 and/or one or more of its sub-components being executed by processor 305. Memory 302 can include any type of computer-readable medium usable by a computer or processor 305, such as RAM, ROM, tapes, magnetic discs, optical discs, volatile memory, non-volatile memory, and any combination thereof. In an aspect, for example, memory 302 may be a computer-readable storage medium that stores one or more computer-executable codes defining communicating component 340 and/or one or more of its sub-components. Additionally or alternatively, the UE 115 may include a bus 311 for communicatively coupling one or more of the RF front end 390, the transceiver 374, the memory 302, or the processor 305, and to exchange signaling information between each of the components and/or sub-components of the UE 115.

In an aspect, the processor(s) 305 may correspond to one or more of the processors described in connection with the UE in FIG. 7. Similarly, the memory 302 may correspond to the memory described in connection with the UE in FIG. 7.

In examples described herein, one or more base stations 105, via scheduling component 240, can configure one or more UEs 115 to communicate using SPS resources. This can include scheduling component 240 configuring the one or more UEs 115 to communicate using SPS, and then subsequently configuring SPS resources over which the UEs 115 can communicate. The SPS resources can be periodic and according to a period defined by the scheduling component 240, and scheduling component 240 may configure the one or more UEs 115 with the period at which the UEs 115 should check for SPS activation/deactivation commands. For example, scheduling component 240 may configure the period for each UE using RRC or other higher layer signaling. Based on the configured or defined period, scheduling component 240 can indicate (e.g., via an activation command transmitted over a control channel, such as a physical downlink control channel (PDCCH)), to activate SPS communications at the one or more UEs 115 during a period of time. The one or more UEs 115 can accordingly determine SPS occasions for communicating with the base station 105 during the period of time. In an example, to facilitate retransmission over SPS resources (e.g., where an initial transmission is not properly received and/or decoded by the base station 105), scheduling component 240 can scramble resource assignments (or at least a cyclic redundancy check (CRC) portion of the resource assignments) using an identifier assigned to each UE 115 such that the UEs 115 can identify SPS resource assignments over the control channel by attempting to descramble portions of the control channel using the identifier. In an example, the identifier can be a specific SPS radio network temporary identifier (SPS-RNTI) assigned to the UE 115 by the base station 105. Aspects described herein relate to a UE 115 having SPS resources configured with the base station 105.

FIG. 4 illustrates a flow chart of an example of a method 400 for detecting (e.g., by a UE 115) a request for SPS retransmission with no corresponding SPS activation. In method 400, blocks indicated as dashed boxes may represent optional steps.

In method 400, at Block 402, an indication to retransmit information for SPS resources can be received from an access point. In an aspect, retransmitting component 344, e.g., in conjunction with processor(s) 305, memory 302, transceiver 370 and/or communicating component 340, can receive, from the access point (e.g., base station 105) the indication to retransmit the information for the SPS resources. As described, for example, UE 115 can be configured to communicate in an SPS communication mode over configured SPS resources. In an example, base station 105 can configure the SPS resources based on configuring a SPS period and/or correspondingly activating SPS communications for the UEs 115. In another example, e.g., for retransmissions, the base station 105 can configure the SPS resources using a control channel with SPS grants for multiple UEs 115 scrambled based on a UE identifier (e.g., a SPS-RNTI). In either case, the UEs 115 can determine SPS resources and transmit or receive information to the base station 105 over the configured SPS resources. For example, the information can correspond to data to be transmitted over the SPS resources, such as at least a portion of one or more packets (e.g., a packet, a lower layer protocol data unit (PDU), service data unit (SDU), one or more packets, PDUs, or SDUs, etc.). The base station 105 can transmit feedback for the resources and/or can request retransmission when certain information is not properly received from the UEs 115. For example, the information may not be properly decoded at the base station 105, may fail a cyclic redundancy check (CRC) or other validation at the base station 105, etc. Thus, the base station 105 can request retransmission of the information sent over the SPS resources. The request for retransmission may be performed via a dynamically scheduled PDCCH transmission (e.g., and/or based on SPS-RNTI of the UE, as described).

In a specific example, the base station 105 can request retransmission by setting a new data indicator (NDI) to indicate whether the UE 115 is to transmit new information or a retransmission of the previous information. For example, the base station 105 can transmit SPS parameters to the UE 115 in control channel data (e.g., over PDCCH), where the parameters can indicate or can be scrambled by a SPS-RNTI of the UE 115 and can specify the NDI. For example, toggling the NDI can indicate that the UE 115 is to transmit new data. In this example, to indicate retransmission, the NDI can be the same as the NDI transmitted to the UE 115 with the previous grant for SPS resources. In this regard, communicating component 340 can receive the SPS parameters over the control channel, can detect that the SPS parameters are intended for the UE 115 based on an associated SPS-RNTI, and can determine that the NDI indicates retransmission.

In method 400, at Block 404, it can be determined that a SPS activation for the SPS resources is not received from the access point. In an aspect, grant receiving component 342, e.g., in conjunction with processor(s) 305, memory 302, transceiver 370 and/or communicating component 340, can determine that the SPS activation for the SPS resources is not received from the access point (e.g., base station 105). For example, the base station 105 can transmit a dynamic grant for retransmitting the information on the SPS resource, but the UE 115 may not properly receive the SPS activation due to poor radio conditions, network overload, or other reasons. For example, the SPS grant can correspond to the control data sent over the control channel (e.g., PDCCH) to activate SPS communications. Thus, in an example, grant receiving component 342 can determine that the SPS grant is not received based on determining that the retransmission indication (e.g., NDI) is received from the base station 105 while the UE has not previously received a corresponding SPS grant (e.g., the retransmission indication is received after an initial transmission or previous retransmission of the information without receiving the corresponding SPS grant). Without receiving the SPS grant, conventional UEs does not perform any transmission, which can cause undesirable quality or performance in wireless communications as the associated user data is lost. Subsequent packets, transmitted in subsequent SPS occasions may be lost as well, which can result in total failure of data transmission. In the examples described herein the UE 115 may perform an activation recovery procedure or use previous SPS grant parameters to recover and retransmit the requested information.

In method 400, at Block 406, one or more signals can be transmitted to the access point and based on determining that the SPS activation is not received. In an aspect, retransmitting component 344 and/or activation recovery component 346, e.g., in conjunction with processor(s) 305, memory 302, transceiver 370 and/or communicating component 340, can transmit, to the access point (e.g., base station 105) and based on determining that the SPS activation is not received, the one or more signals. As described herein, transmitting the one or more signals can include transmitting a random access channel (RACH) request or scheduling request (SR) to obtain a subsequent grant, retransmission of the original information (e.g., the information to be retransmitted at Block 402) based on previously received SPS communication parameters, and/or the like.

Thus, in one example, transmitting the one or more signals at Block 406 may optionally include, at Block 408, transmitting a RACH request to the access point. In an aspect, activation recovery component 346, e.g., in conjunction with processor(s) 305, memory 302, transceiver 370 and/or communicating component 340, can transmit the RACH request to the access point (e.g., base station 105), in performing a RACH procedure with the access point. This may be part of an activation recovery procedure to obtain a subsequent grant of resources for transmitting the original information, as described herein. For example, the RACH request may be part of a RACH procedure defined in a wireless communication technology (such as 5G, LTE, etc.) that includes multiple messages for establishing an active connection with the base station 105. For example, the RACH request may be a first message in the RACH procedure (e.g., a RACH preamble), a third message in the RACH procedure, etc., such that the RACH procedure can be used to request a scheduling grant (to be received in the RACH response) from the base station 105.

In one example, transmitting the one or more signals at Block 406 may optionally include, at Block 410, transmitting a SR to the access point. In an aspect, activation recovery component 346, e.g., in conjunction with processor(s) 305, memory 302, transceiver 370 and/or communicating component 340, can transmit the SR to the access point (e.g., base station 105). This may be part of an activation recovery procedure to obtain a subsequent grant of resources for transmitting the original information, as described herein. For example, the SR can be used (e.g., in 5G, LTE, etc., at the physical layer) to request, by the UE 115, a scheduling grant from the base station 105. Based on receiving the SR, for example, the base station 105 can generate a subsequent grant for the UE 115. The base station 105 is not expecting to receive a SR request from a UE 115 for which it has configured and activated SPS, as the UE 115 already has received resource grants for SPS communications. The base station 105 may handle the SR request from this UE 115 as an indication that the UE 115 has missed the SPS activation command. The base station 105 may identify the UE 115 identity via the SR resource used by the UE 115. In one example, the base station 105 may provide one or more dynamic resource grants to clear up a buffer in the UE 115, then the base station may transmit SPS activation command to this UE 115 to rely on semi-persistent scheduling.

In another example, transmitting the one or more signals at Block 406 can optionally include, at Block 412, utilizing a previously received SPS grant to derive one or more parameters for transmitting the information in the one or more signals. In an aspect, retransmitting component 344, e.g., in conjunction with processor(s) 305, memory 302, transceiver 370 and/or communicating component 340, can utilize the previously received SPS grant to derive the one or more parameters for transmitting the information in the one or more signals. For example, retransmitting component 344 can use a MCS, IRV, RBs, TBS, etc. of a previously received SPS grant to retransmit the original information (from Block 402) in the one or more signals. For example, where the base station 105 did not modify these parameters for the SPS grant not received for the retransmission, the base station 105 may receive the retransmission using the previously utilized parameters.

In an example, where the RACH request is transmitted at Block 408, optionally at Block 414, a RACH response indicating a subsequent grant can be received. In an aspect, activation recovery component 346, e.g., in conjunction with processor(s) 305, memory 302, transceiver 370 and/or communicating component 340, can receive the RACH response indicating the subsequent grant, where the RACH response may indicate a dynamic scheduled grant or a subsequent SPS grant, etc. For example, the RACH response may be received as part of the RACH procedure in response to the RACH request (e.g., a second RACH preamble responds message, a fourth message, etc.). The RACH response may include an indication of resources (e.g., a resource grant) the UE 115 can use to communicate with the base station 105. In an example, the RACH response may also include the SPS-RNTI of the UE 115.

In this example, optionally at Block 416, the information can be transmitted over the resources in the subsequent grant. In an aspect, retransmitting component 344, e.g., in conjunction with processor(s) 305, memory 302, transceiver 370 and/or communicating component 340, can transmit the information over the resources in the subsequent grant. For example, retransmitting component 344 can determine the resources of the subsequent grant from the RACH response for retransmitting the information. In this example, the base station 105 may not be expecting to receive a RACH request from a UE 115 for which it has configured and activated SPS. The base station 105 may be expected to handle the RACH request from this UE 115 as an indication that the UE 115 has missed the SPS activation command. The base station 105 may identify the UE 115 identity via the third RACH message. In one example, the base station 105 may provide one or more dynamic resource grants to clear up a buffer in the UE 115, then the base station 105 may transmit the SPS activation command to this UE 115. Thus, retransmitting component 344 can transmit the information as a retransmission (or a new transmission) of the original information (e.g., from Block 402) over the resources.

Additionally, in this example, the UE 115 can decode the SPS activation grant in the subsequent SPS grant from the base station 105 and can recover from the previous state in time to retransmit the information (e.g., less than 100 milliseconds (ms), which can include about 24 ms to detect the subsequent SPS uplink retransmission grant and about 50 ms to perform connected mode RACH, at least where RACH is used to request the subsequent SPS grant). In addition, the subsequent SPS grant can include additional parameters for transmitting over the subsequent SPS resources, including MCS, IRV, RBs, TBS, etc., and retransmitting component 344 can transmit the information (e.g., as the original information from Block 402) according to the subsequent SPS grant based on these additional parameters. The base station 105 can receive the retransmission of the information based on these parameters indicated by the subsequent SPS grant.

In another example, where the SR is transmitted at Block 410, optionally at Block 418, a response to the SR indicating a subsequent grant can be received. In an aspect, activation recovery component 346, e.g., in conjunction with processor(s) 305, memory 302, transceiver 370 and/or communicating component 340, can receive the response to the SR indicating the subsequent grant. The base station 105 can transmit the subsequent grant to the UE 115, which may include a dynamic scheduled grant, an SPS grant, etc., as described. Thus, the base station 105 may transmit control data over a control channel (e.g., PDCCH), an SPS activation command, etc., indicating the subsequent grant. For example, the control data can indicate and/or can be scrambled (e.g., at least at a CRC portion) by the SPS-RNTI of the UE 115, and the UE 115 can detect the SPS grant from the base station 105 in the control channel by identifying and/or descrambling the information (or at least the CRC portion) based on the SPS-RNTI.

In addition, in this example, optionally at Block 416, the information can be transmitted over the resources in the subsequent grant. In an aspect, retransmitting component 344, e.g., in conjunction with processor(s) 305, memory 302, transceiver 370 and/or communicating component 340, can transmit the information over the resources in the subsequent grant. For example, retransmitting component 344 can determine the resources of the subsequent grant from the response received from the SR for retransmitting the information. In this example, the base station 105 may not be expecting to receive a SR from a UE 115 for which it has configured and activated SPS. The base station 105 may be expected to handle the SR from this UE 115 as an indication that the UE 115 has missed the SPS activation command. In one example, the base station 105 may provide one or more dynamic resource grants to clear up a buffer in the UE 115, then the base station 105 may transmit the SPS activation command to this UE 115 in response to the SR. Thus, retransmitting component 344 can transmit the information as a retransmission (or a new transmission) of the original information (e.g., from Block 402) over the resources. In addition, the subsequent SPS grant can include additional parameters for transmitting over the subsequent SPS resources, including MCS, IRV, RBs, TBS, etc., and retransmitting component 344 can transmit the information (e.g., as the original information from Block 402) according to the subsequent SPS grant based on these additional parameters. The base station 105 can receive the retransmission of the information based on these parameters indicated by the subsequent SPS grant.

FIG. 5 illustrates a flow chart of an example of a method 500 for modifying (e.g., by a UE) one or more communication parameters based on activating a SPS communication mode. In method 500, blocks indicated as dashed boxes may represent optional steps.

In method 500, at Block 502, SPS communications can be configured with an access point based on receiving an indication from the access point. In an aspect, communicating component 340, e.g., in conjunction with processor(s) 305, memory 302, and/or transceiver 370, can configure, based on receiving the indication from the access point (e.g., base station 105), SPS communications with the access point. For example, base station 105 can configure SPS communications with the UE 115 using higher layer signaling, such as RRC layer signaling, and may include assigning the SPS-RNTI to the UE 115. In another example, configuring the SPS communications may also include activating (or detecting activation of) the SPS communications based on a downlink control indicator (DCI) received from the base station 105. In an example, the DCI may be scrambled by the SPS-RNTI, and the communicating component 340 can receive and descramble (e.g., a CRC portion of) the DCI to detect activation of SPS communications. Based on detecting activation of the SPS communications, for example, the UE 115 can modify one or more parameters to improve quality/reception for SPS communications, as described herein.

In method 500, optionally at Block 504, one or more power savings features can be modified based on configuring SPS communications. In an aspect, communicating component 340, e.g., in conjunction with processor(s) 305, memory 302, and/or transceiver 370, can modify, based on configuring the SPS communications, the one or more power savings features. For example, based on configuring the SPS communications, communicating component 340 can disable the one or more power savings features of the UE 115, decrease an amount of time corresponding to the power savings features, decrease a difference in power applied to achieve the power savings features, etc., such to decrease scenarios when transceiver 370 or other components of the UE 115 are in a power savings mode. In one example, communicating component 340 can configure a higher number of receive antennas, or enable advanced receiver algorithms such as interference cancellation. This can improve the likelihood of the UE 115 successfully receiving the SPS activation over the control channel (e.g., PDCCH) considering SPS is configured.

In method 500, optionally at Block 506, a TRM priority of a subscription configured for the SPS communications can be modified based on configuring SPS communications. In an aspect, communicating component 340, e.g., in conjunction with processor(s) 305, memory 302, and/or transceiver 370, can modify, based on configuring the SPS communications, the TRM priority of the subscription configured for the SPS communications. For example, based on configuring the SPS communications, communicating component 340 can increase the transceiver manager priority of the subscription configured for the SPS communications. This can avoid tune-away features where the UE 115 can otherwise tune-away from communications with the base station 105 to measure other base stations and/or other corresponding wireless communication technologies. Avoiding the tune-away can also improve the likelihood of the UE 115 successfully receiving the SPS activation over the control channel (e.g., PDCCH).

Additionally, where SPS communications are deactivated, the one or more communication parameters can be modified (e.g., to an original value). For example, optionally at Block 508, SPS communications can be deactivated with the access point. In an aspect, communicating component 340, e.g., in conjunction with processor(s) 305, memory 302, and/or transceiver 370, can deactivate SPS communications with the access point. For example, base station 105 can deactivate SPS communications with the UE 115 using higher layer signaling, such as RRC layer signaling. In an example, base station 105 may deactivate SPS communications based on ending a VoLTE call, determining certain network conditions or radio environment conditions in communications with the UE 115, and/or the like. Based on detecting deactivation of the SPS communications, for example, the UE 115 can modify one or more parameters to that were previously modified based on detecting SPS configuration, as described above.

In method 500, optionally at Block 510, one or more power savings features can be modified based on deactivating the SPS communications. In an aspect, communicating component 340, e.g., in conjunction with processor(s) 305, memory 302, and/or transceiver 370, can modify, based on deactivating the SPS communications, the one or more power savings features. For example, based on deactivating the SPS communications, communicating component 340 can enable the one or more power savings features of the UE 115, increase an amount of time corresponding to the power savings features, increase a difference in power applied to achieve the power savings features, etc., implement a power savings mode. In one example, communicating component 340 can enable a ARD feature of the UE 115, such as a conditional 1RX mode, at least while SPS is deactivated.

In method 500, optionally at Block 512, a TRM priority of a subscription configured for the SPS communications can be modified based on deactivating the SPS communications. In an aspect, communicating component 340, e.g., in conjunction with processor(s) 305, memory 302, and/or transceiver 370, can modify, based on deactivating the SPS communications, the TRM priority of the subscription configured for the SPS communications. For example, based on deactivating the SPS communications, communicating component 340 can decrease the TRM priority of the subscription configured for the SPS communications to a value used before SPS configuration was activated. This can enable tune-away features where the UE 115 can tune-away from communications with the base station 105 to measure other base stations and/or other corresponding wireless communication technologies.

FIG. 6 illustrates a flow chart of an example of a method 600 for detecting (e.g., by an access point or base station (e.g., base station 105-a), such as an eNB, gNB, etc.) that a UE did not receive a SPS grant for retransmitting information. In method 600, blocks indicated as dashed boxes may represent optional steps.

In method 600, at Block 602, a request for retransmitting information over SPS resources can be transmitted to a device. In an aspect, retransmission requesting component 242, e.g., in conjunction with processor(s) 205, memory 202, and/or transceiver 270, and/or scheduling component 240, can transmit, to the device (e.g., UE 115), a request for retransmitting the information over the SPS resources. For example, the information can correspond to at least a portion of data to be transmitted over the SPS resources (e.g., at least a portion of a packet, such as a VoLTE packet, one or more packets, etc.). As described, for example, retransmission requesting component 242 can transmit the request to the device by transmitting control information over a control channel (e.g., PDCCH) indicating the SPS-RNTI of the UE and a NDI that is not toggled from a previous NDI. The UE 115 can accordingly determine that the request indicates to retransmit the information, as described.

In method 600, at Block 604, it can be determined that the device did not receive a SPS activation and/or a SPS grant for the SPS resources. In an aspect, resource granting component 244, e.g., in conjunction with processor(s) 205, memory 202, transceiver 270, and/or scheduling component 204, can determine that the device (e.g. UE 115) did not receive the SPS activation and/or the SPS grant for the SPS resources. For example, resource granting component 244 can receive an indication that the device did not receive the SPS activation (and thus did not determine an SPS opportunity) and/or an SPS grant (e.g., a dynamic scheduled grant for retransmission). The indication may include a RACH request, SR, etc., received from the UE 115, as described in method 400 of FIG. 4, and/or resource granting component 244 can infer that the device did not receive the SPS activation and/or grant. In either case, based on determining that the device did not receive the SPS activation and/or grant, the base station 105 can attempt to provide a subsequent grant to the UE 115, as described further herein, to prevent missing communications from the UE 115, where the subsequent grant can include SPS resources and/or one or more dynamic grants, as described.

For example, determining that the device did not receive the SPS activation and/or the SPS grant at Block 604 can optionally include, at Block 606, detecting that a threshold number of consecutive requests for retransmitting have been transmitted to the device. In an aspect, resource granting component 244, e.g., in conjunction with processor(s) 205, memory 202, transceiver 270, and/or scheduling component 204, can detect that the threshold number of consecutive requests for retransmitting have been transmitted to the device (e.g., UE 115). For example, resource granting component 244 can detect that the threshold number of consecutive requests, including the request transmitted at Block 602, have been achieved. For example, the consecutive requests can relate to request for retransmitting the same information from the UE 115. Achieving the threshold number, which can be configured by the base station 105 based on a static or dynamic configuration, can be determined to indicate that the UE 115 did not receive the SPS grant for retransmitting the information. In another example, a more explicit indication that the UE 115 did not receive the SPS grant can be received.

In one example, in this regard, determining that the device did not receive the SPS activation and/or the SPS grant at Block 604 can optionally include, at Block 608, receiving, from the device, a RACH request. In an aspect, resource granting component 244, e.g., in conjunction with processor(s) 205, memory 202, transceiver 270, and/or scheduling component 204, can receive the RACH request from the device (e.g., UE 115). As described, the RACH request can indicate that the UE 115 is requesting a SPS grant for retransmitting information over SPS resources. Similarly, in an example, determining that the device did not receive the SPS activation and/or the SPS grant at Block 604 can optionally include, at Block 610, receiving, from the device, a SR. In an aspect, resource granting component 244, e.g., in conjunction with processor(s) 205, memory 202, transceiver 270, and/or scheduling component 204, can receive the SR request from the device (e.g., UE 115). As described, the SR can indicate that the UE 115 is requesting a SPS grant for retransmitting information over SPS resources.

In method 600, at Block 612, a subsequent grant can be transmitted to the device and based on detecting that the device did not receive the SPS activation or the SPS grant. In an aspect, resource granting component 244, e.g., in conjunction with processor(s) 205, memory 202, transceiver 270, and/or scheduling component 204, can transmit, to the device (e.g., UE 115) and based on detecting that the device did not receive the SPS activation or the SPS grant, the subsequent grant. In an example, the subsequent grant may indicate resources for uplink transmission, and may include a subsequent grant of SPS resources (e.g., an SPS activation command), a dynamic scheduled grant, etc., as described. For example, resource granting component 244 can transmit control data on a control channel (e.g., PDCCH) with the SPS-RNTI (e.g., indicated in the control data, used to scramble a CRC portion of the control data, etc.) and can toggle the NDI in the control data to indicate a SPS grant. The UE 115 can receive the subsequent SPS grant an accordingly retransmit the information over resources corresponding to the subsequent SPS grant.

Figure 7:
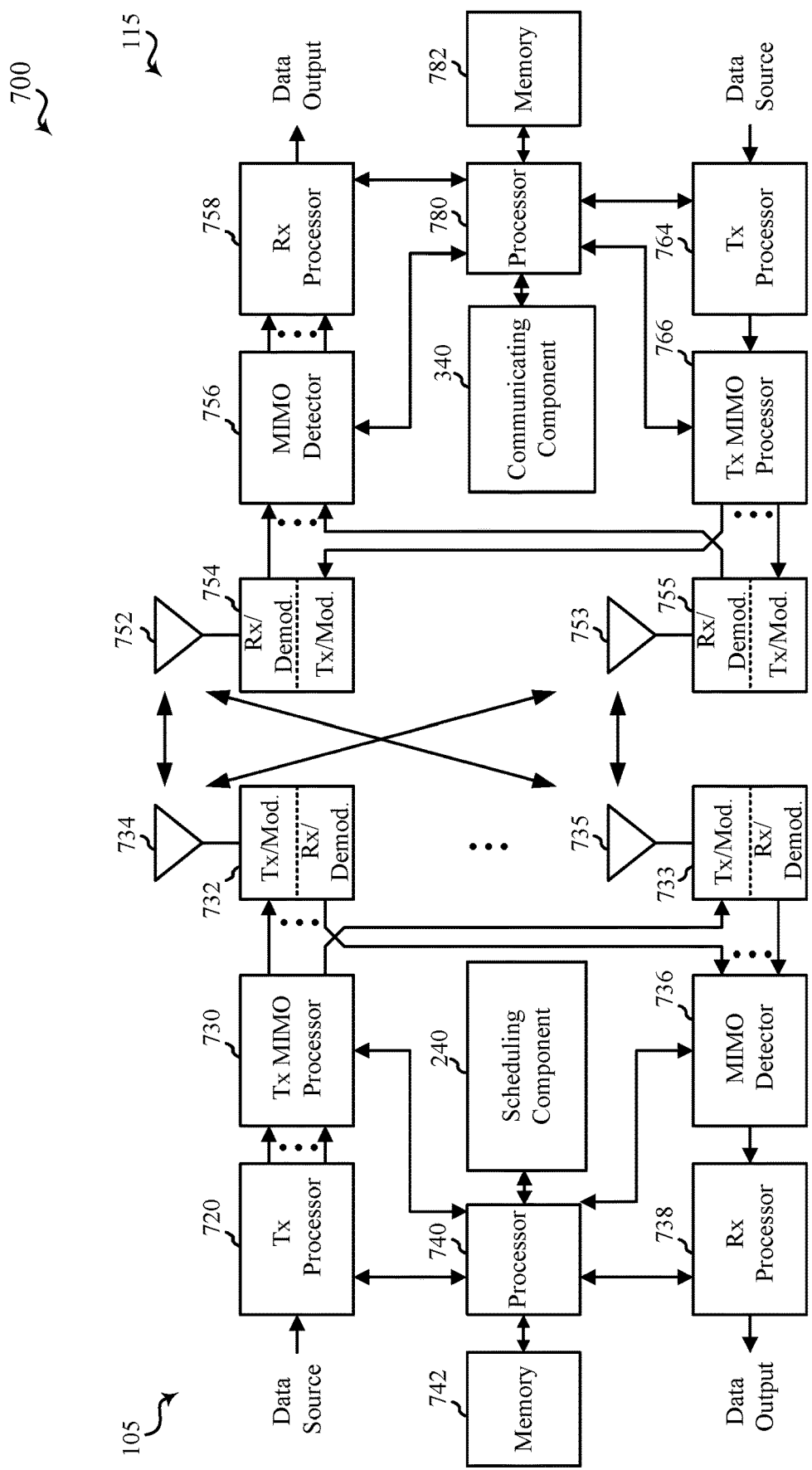
FIG. 7 is a block diagram illustrating an example of a MIMO communication system including a base station and a UE, in accordance with various aspects of the present disclosure.

FIG. 7 is a block diagram of a MIMO communication system 700 including a base station 105 and a UE 115. The MIMO communication system 700 may illustrate aspects of the wireless communication system 100 described with reference to FIG. 1. The base station 105 may be an example of aspects of the base station 105 described with reference to FIGS. 1-3. The base station 105 may be equipped with antennas 734 and 735, and the UE 115 may be equipped with antennas 752 and 753. In the MIMO communication system 700, the base station 105 may be able to send data over multiple communication links at the same time. Each communication link may be called a "layer" and the "rank" of the communication link may indicate the number of layers used for communication. For example, in a 2×2 MIMO communication system where base station 105 transmits two "layers," the rank of the communication link between the base station 105 and the UE 115 is two.

At the base station 105, a transmit (Tx) processor 720 may receive data from a data source. The transmit processor 720 may process the data. The transmit processor 720 may also generate control symbols or reference symbols. A transmit MIMO processor 730 may perform spatial processing (e.g., precoding) on data symbols, control symbols, or reference symbols, if applicable, and may provide output symbol streams to the transmit modulator/demodulators 732 and 733. Each modulator/demodulator 732 through 733 may process a respective output symbol stream (e.g., for OFDM, etc.) to obtain an output sample stream. Each modulator/demodulator 732 through 733 may further process (e.g., convert to analog, amplify, filter, and upconvert) the output sample stream to obtain a DL signal. In one example, DL signals from modulator/demodulators 732 and 733 may be transmitted via the antennas 734 and 735, respectively.

The UE 115 may be an example of aspects of the UEs 115 described with reference to FIGS. 1-3. At the UE 115, the UE antennas 752 and 753 may receive the DL signals from the base station 105 and may provide the received signals to the modulator/demodulators 754 and 755, respectively. Each modulator/demodulator 754 through 755 may condition (e.g., filter, amplify, downconvert, and digitize) a respective received signal to obtain input samples. Each modulator/demodulator 754 through 755 may further process the input samples (e.g., for OFDM, etc.) to obtain received symbols. A MIMO detector 756 may obtain received symbols from the modulator/demodulators 754 and 755, perform MIMO detection on the received symbols, if applicable, and provide detected symbols. A receive (Rx) processor 758 may process (e.g., demodulate, deinterleave, and decode) the detected symbols, providing decoded data for the UE 115 to a data output, and provide decoded control information to a processor 780, or memory 782.

The processor 780 may in some cases execute stored instructions to instantiate a communicating component 340 (see e.g., FIGS. 1 and 3).

On the uplink (UL), at the UE 115, a transmit processor 764 may receive and process data from a data source. The transmit processor 764 may also generate reference symbols for a reference signal. The symbols from the transmit processor 764 may be precoded by a transmit MIMO processor 766 if applicable, further processed by the modulator/demodulators 754 and 755 (e.g., for SC-FDMA, etc.), and be transmitted to the base station 105 in accordance with the communication parameters received from the base station 105. At the base station 105, the UL signals from the UE 115 may be received by the antennas 734 and 735, processed by the modulator/demodulators 732 and 733, detected by a MIMO detector 736 if applicable, and further processed by a receive processor 738. The receive processor 738 may provide decoded data to a data output and to the processor 740 or memory 742.

The processor 740 may in some cases execute stored instructions to instantiate a scheduling component 240 (see e.g., FIGS. 1 and 2).

The components of the UE 115 may, individually or collectively, be implemented with one or more ASICs adapted to perform some or all of the applicable functions in hardware. Each of the noted modules may be a means for performing one or more functions related to operation of the MIMO communication system 700. Similarly, the components of the base station 105 may, individually or collectively, be implemented with one or more ASICs adapted to perform some or all of the applicable functions in hardware. Each of the noted components may be a means for performing one or more functions related to operation of the MIMO communication system 700.

The above detailed description set forth above in connection with the appended drawings describes examples and does not represent the only examples that may be implemented or that are within the scope of the claims. The term "example," when used in this description, means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and apparatuses are shown in block diagram form in order to avoid obscuring the concepts of the described examples.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, computer-executable code or instructions stored on a computer-readable medium, or any combination thereof.

The various illustrative blocks and components described in connection with the disclosure herein may be implemented or performed with a specially-programmed device, such as but not limited to a processor, a digital signal processor (DSP), an ASIC, a FPGA or other programmable logic device, a discrete gate or transistor logic, a discrete hardware component, or any combination thereof designed to perform the functions described herein. A specially-programmed processor may be a microprocessor, but in the alternative, the processor may be any conventional processor, controller, microcontroller, or state machine. A specially-programmed processor may also be implemented as a combination of computing devices, e.g., a combination of a DSP and a microprocessor, multiple microprocessors, one or more microprocessors in conjunction with a DSP core, or any other such configuration.

The functions described herein may be implemented in hardware, software executed by a processor, firmware, or any combination thereof. If implemented in software executed by a processor, the functions may be stored on or transmitted over as one or more instructions or code on a non-transitory computer-readable medium. Other examples and implementations are within the scope and spirit of the disclosure and appended claims. For example, due to the nature of software, functions described above can be implemented using software executed by a specially programmed processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items prefaced by "at least one of" indicates a disjunctive list such that, for example, a list of "at least one of A, B, or C" means A or B or C or AB or AC or BC or ABC (i.e., A and B and C).

Computer-readable media includes both computer storage media and communication media including any medium that facilitates transfer of a computer program from one place to another. A storage medium may be any available medium that can be accessed by a general purpose or special purpose computer. By way of example, and not limitation, computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The previous description of the disclosure is provided to enable a person skilled in the art to make or use the disclosure. Various modifications to the disclosure will be readily apparent to those skilled in the art, and the common principles defined herein may be applied to other variations without departing from the spirit or scope of the disclosure. Furthermore, although elements of the described aspects and/or embodiments may be described or claimed in the singular, the plural is contemplated unless limitation to the singular is explicitly stated. Additionally, all or a portion of any aspect and/or embodiment may be utilized with all or a portion of any other aspect and/or embodiment, unless stated otherwise. Thus, the disclosure is not to be limited to the examples and designs described herein but is to be accorded the widest scope consistent with the principles and novel features disclosed herein.

What is claimed is:

1. A method for utilizing semi-persistent scheduling (SPS) resources in wireless communications, comprising:
    modifying one or more power savings features related to SPS communications with an access point, wherein the one or more power savings features include an automatic receive diversity (ARD) feature;
    receiving, from the access point, an indication to retransmit information for SPS resources;
    determining that a SPS activation for the SPS resources is not received from the access point; and
    transmitting, to the access point and based on determining that the SPS activation is not received, one or more signals.

2. The method of claim 1, wherein transmitting the one or more signals comprises transmitting a random access channel (RACH) request to the access point as part of an activation recovery procedure to obtain a subsequent grant for uplink transmission.

3. The method of claim 2, further comprising:
    receiving, from the access point, the subsequent grant, wherein the subsequent grant corresponds to SPS resources or dynamic scheduled resources; and
    transmitting, to the access point, the information as a new transmission over the SPS resources or dynamic scheduled resources indicated by the subsequent grant.

4. The method of claim 3, wherein receiving the subsequent grant comprises receiving, from the access point and based on the RACH request, a RACH response indicating the subsequent grant.

5. The method of claim 1, wherein transmitting the one or more signals comprises transmitting a scheduling request (SR) to the access point as part of an activation recovery procedure to obtain a subsequent grant for uplink transmission.

6. The method of claim 5, further comprising:
receiving, from the access point, the subsequent grant in response to the SR, wherein the subsequent grant corresponds to SPS resources or dynamic scheduled resources; and
transmitting, to the access point, the information as a new transmission over the SPS resources or dynamic scheduled resources indicated by the subsequent grant.

7. The method of claim 1, wherein transmitting the one or more signals comprises utilizing a previously received SPS grant to derive one or more parameters for retransmitting the information.

8. The method of claim 7, wherein the one or more parameters correspond to a modulation and coding scheme (MCS) or an incremental redundancy version (IRV) of the previously received SPS grant.

9. The method of claim 1, further comprising modifying, based on configuring SPS communications, a transceiver resource manager (TRM) priority of a subscription configured for the SPS communications.

10. An apparatus for utilizing semi-persistent scheduling (SPS) resources in wireless communications, comprising:
a transceiver for communicating one or more wireless signals via at least a transmitter and one or more antennas;
a memory configured to store instructions; and
one or more processors communicatively coupled with the transceiver and the memory, wherein the one or more processors are configured to:
modify one or more power savings features related to SPS communications with an access point, wherein the one or more power savings features include an automatic receive diversity (ARD) feature;
receive, from the access point, an indication to retransmit information for SPS resources;
determine that a SPS activation for the SPS resources is not received from the access point; and
transmit, to the access point and based on determining that the SPS activation is not received, one or more signals.

11. The apparatus of claim 10, wherein the at least one processor is configured to transmit the one or more signals as a random access channel (RACH) request to the access point as part of an activation recovery procedure to obtain a subsequent grant for uplink transmission.

12. The apparatus of claim 11, wherein the at least one processor is further configured to:
receive, from the access point, the subsequent grant, wherein the subsequent grant corresponds to SPS resources or dynamic scheduled resources; and
transmit, to the access point, the information as a new transmission over the SPS resources or dynamic scheduled resources indicated by the subsequent grant.

13. The apparatus of claim 12, wherein the at least one processor is configured to receive the subsequent grant, from the access point and based on the RACH request, as a RACH response indicating the subsequent grant.

14. The apparatus of claim 10, wherein the at least one processor is configured to transmit the one or more signals as a scheduling request (SR) to the access point as part of an activation recovery procedure to obtain a subsequent grant for uplink transmission.

15. The apparatus of claim 14, wherein the at least one processor is further configured to:
receive, from the access point, the subsequent grant in response to the SR, wherein the subsequent grant corresponds to SPS resources or dynamic scheduled resources; and
transmit, to the access point, the information as a new transmission over the SPS resources or dynamic scheduled resources indicated by the subsequent grant.

16. The apparatus of claim 10, wherein the at least one processor is configured to transmit the one or more signals based at least in part on utilizing a previously received SPS grant to derive one or more parameters for retransmitting the information.

17. The apparatus of claim 16, wherein the one or more parameters correspond to a modulation and coding scheme (MCS) or an incremental redundancy version (IRV) of the previously received SPS grant.

18. The apparatus of claim 10, wherein the one or more processors are configured to modify, based on configuring SPS communications, a transceiver resource manager (TRM) priority of a subscription configured for the SPS communications.

19. An apparatus for utilizing semi-persistent scheduling (SPS) resources in wireless communications, comprising:
means for modifying one or more power savings features related to SPS communications with an access point, wherein the one or more power savings features include an automatic receive diversity (ARD) feature;
means for receiving, from the access point, an indication to retransmit information for SPS resources;
means for determining that a SPS activation for the SPS resources is not received from the access point; and
means for transmitting, to the access point and based on determining that the SPS activation is not received, one or more signals.

20. The apparatus of claim 19, wherein the means for transmitting the one or more signals transmits at least one of a random access channel (RACH) request to the access point or a scheduling request (SR) to the access point, as part of an activation recovery procedure to obtain a subsequent grant for uplink transmission.

21. The apparatus of claim 20, further comprising:
means for receiving, from the access point, the subsequent grant, wherein the subsequent grant corresponds to SPS resources or dynamic scheduled resources; and
means for transmitting, to the access point, the information as a new transmission over the SPS resources or dynamic scheduled resources indicated by the subsequent grant.

22. The apparatus of claim 19, wherein the means for transmitting the one or more signals comprises utilizes a previously received SPS grant to derive one or more parameters for retransmitting the information.

23. The apparatus of claim 19, further comprising modifying, based on configuring the SPS communications, a transceiver resource manager (TRM) priority of a subscription configured for the SPS communications.

24. A non-transitory computer-readable medium, comprising code executable by one or more processors for utilizing semi-persistent scheduling (SPS) resources in wireless communications, the code comprising:

code for modifying one or more power savings features related to SPS communications with an access point, wherein the one or more power savings features include an automatic receive diversity (ARD) feature;
  code for receiving, from the access point, an indication to retransmit information for SPS resources;
  code for determining that a SPS activation for the SPS resources is not received from the access point; and
  code for transmitting, to the access point and based on determining that the SPS activation is not received, one or more signals.

25. The non-transitory computer-readable medium of claim 24, wherein the code for transmitting the one or more signals transmits at least one of a random access channel (RACH) request to the access point or a scheduling request (SR) to the access point, as part of an activation recovery procedure to obtain a subsequent grant for uplink transmission.

26. The non-transitory computer-readable medium of claim 25, further comprising:
  code for receiving, from the access point, the subsequent grant, wherein the subsequent grant corresponds to SPS resources or dynamic scheduled resources; and
  code for transmitting, to the access point, the information as a new transmission over the SPS resources or dynamic scheduled resources indicated by the subsequent grant.

27. The non-transitory computer-readable medium of claim 24, wherein the code for transmitting the one or more signals utilizes a previously received SPS grant to derive one or more parameters for retransmitting the information.

28. The non-transitory computer-readable medium of claim 24, further comprising modifying, based on configuring the SPS communications, a transceiver resource manager (TRM) priority of a subscription configured for the SPS communications.

29. A method for allocating semi-persistent scheduling (SPS) resources in wireless communications, comprising:
  transmitting, by an access point and to a device, a request for retransmitting information over SPS resources;
  determining, by the access point, that the device did not receive at least one of a SPS activation or a SPS grant for the SPS resources; and
  transmitting, to the device and based on detecting that the device did not receive at least one of the SPS activation or the SPS grant, a subsequent grant to schedule resources for uplink transmission,
  wherein detecting that the device did not receive at least one of the SPS activation or the SPS grant comprises at least one of detecting, by the access point, that a threshold number of consecutive requests for retransmitting have been transmitted to the device, receiving, by the access point and from the device, a random access channel (RACH) request, or receiving, by the access point and from the device, a scheduling request for the subsequent grant.

30. The method of claim 29, wherein transmitting the subsequent grant comprises transmitting a RACH response to the RACH request, wherein the RACH response includes the subsequent grant.

31. An apparatus for allocating semi-persistent scheduling (SPS) resources in wireless communications, comprising:
  a transceiver for communicating one or more wireless signals via at least a transmitter and one or more antennas;
  a memory configured to store instructions; and
  one or more processors communicatively coupled with the transceiver and the memory, wherein the one or more processors are configured to:
    transmit, to a device, a request for retransmitting information over SPS resources;
    determine that the device did not receive at least one of a SPS activation or a SPS grant for the SPS resources; and
    transmit, to the device and based on detecting that the device did not receive at least one of the SPS activation or the SPS grant, a subsequent grant to schedule resources for uplink transmission,
    wherein detecting that the device did not receive at least one of the SPS activation or the SPS grant comprises at least one of detecting, by the access point, that a threshold number of consecutive requests for retransmitting have been transmitted to the device, receiving, by the access point and from the device, a random access channel (RACH) request, or receiving, by the access point and from the device, a scheduling request for the subsequent grant.

32. The apparatus of claim 31, wherein the one or more processors are configured to transmit the subsequent grant at least in part by transmitting a RACH response to the RACH request, wherein the RACH response includes the subsequent grant.

33. An apparatus for allocating semi-persistent scheduling (SPS) resources in wireless communications, comprising:
  means for transmitting, by an access point and to a device, a request for retransmitting information over SPS resources;
  means for determining, by the access point, that the device did not receive at least one of a SPS activation or a SPS grant for the SPS resources; and
  means for transmitting, to the device and based on detecting that the device did not receive at least one of the SPS activation or the SPS grant, a subsequent grant to schedule resources for uplink transmission,
  wherein detecting that the device did not receive at least one of the SPS activation or the SPS grant comprises at least one of detecting, by the access point, that a threshold number of consecutive requests for retransmitting have been transmitted to the device, receiving, by the access point and from the device, a random access channel (RACH) request, or receiving, by the access point and from the device, a scheduling request for the subsequent grant.

34. A non-transitory computer-readable medium, comprising code executable by one or more processors for allocating semi-persistent scheduling (SPS) resources in wireless communications, the code comprising:
  code for transmitting, by an access point and to a device, a request for retransmitting information over SPS resources;
  code for determining, by the access point, that the device did not receive at least one of a SPS activation or a SPS grant for the SPS resources; and
  code for transmitting, to the device and based on detecting that the device did not receive at least one of the SPS activation or the SPS grant, a subsequent grant to schedule resources for uplink transmission,
  wherein detecting that the device did not receive at least one of the SPS activation or the SPS grant comprises at least one of detecting, by the access point, that a threshold number of consecutive requests for retransmitting have been transmitted to the device, receiving, by the access point and from the device, a random access channel (RACH) request, or receiving, by the access point and from the device, a scheduling request for the subsequent grant.

\* \* \* \* \*